US012801690B2

(12) United States Patent
Kin

(10) Patent No.: US 12,801,690 B2
(45) Date of Patent: Nov. 17, 2026

(54) ESTIMATION APPARATUS, ESTIMATION SYSTEM, ESTIMATION METHOD AND PROGRAM

(71) Applicant: NTT, Inc., Tokyo (JP)

(72) Inventor: Hideaki Kin, Tokyo (JP)

(73) Assignee: NTT, Inc., Tokyo (JP)

( * ) Notice: Subject to any disclaimer, the term of this patent is extended or adjusted under 35 U.S.C. 154(b) by 1065 days.

(21) Appl. No.: 17/919,910

(22) PCT Filed: Apr. 28, 2020

(86) PCT No.: PCT/JP2020/018115
§ 371 (c)(1),
(2) Date: Oct. 19, 2022

(87) PCT Pub. No.: WO2021/220399
PCT Pub. Date: Nov. 4, 2021

(65) Prior Publication Data

US 2023/0205841 A1 Jun. 29, 2023

(51) Int. Cl.
*G06F 17/17* (2006.01)
*G06F 17/18* (2006.01)

(52) U.S. Cl.
CPC ............ *G06F 17/175* (2013.01); *G06F 17/18* (2013.01)

(58) Field of Classification Search
CPC ........ G06F 17/175; G06F 17/18; G06N 99/00
See application file for complete search history.

(56) References Cited

FOREIGN PATENT DOCUMENTS

JP 2019008637 A 1/2019

OTHER PUBLICATIONS

John, S., "Large-Scale Cox Process Inference using Variational Fourier Features" in Proceedings of the 35th International Conference on Machine Learning, in Proceedings of Machine Learning Research 80:2362-2370. https://proceedings.mlr.press/v80/john18a.html. (Year: 2018).*

Lloyd, et al. (2015) "Variational Inference for Gaussian Process Modulated Poisson Processes," International Conference on Machine Learning, pp. 1814-1822.

Aglietti et al. (2019) "Structured Variational Inference in Continuous Cox Process Models," In Advances in Neural Information Processing Systems, pp. 12437-12447 [online] website: https://github.com/VirgiAgl/STVB.

* cited by examiner

*Primary Examiner* — Carlo Waje

(57) ABSTRACT

An estimation apparatus includes a memory; and a processor configured to execute: taking a set of observation points representing events observed in a space region of a predetermined dimensionality in an observation, an observation count representing the number of times the observation is performed, a first function satisfying a predetermined condition, and a parameter of the first function as inputs; and analytically estimating a rate function for obtaining occurrence rates of the events in the space region.

6 Claims, 7 Drawing Sheets

ESTIMATION APPARATUS, ESTIMATION SYSTEM, ESTIMATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/018115, filed on 28 Apr. 2020, the disclosure of which is hereby incorporated herein by reference in its entirety.

TECHNICAL FIELD

The present invention relates to an estimation apparatus, an estimation system, an estimation method, and a program.

BACKGROUND ART

A Gaussian Cox process is known as a technique for estimating the occurrence rate of an event (hereinafter referred to as a "rate function") at each point in a one-dimensional or multidimensional space using data representing events that have occurred in the space. For example, NPL 1 proposes a method of approximately estimating a rate function using a variational Bayesian method.

CITATION LIST

Non Patent Literature

NPL 1: C. Lloyd, et al., "Variational Inference for Gaussian Process Modulated Poisson Processes," International Conference on Machine Learning, pp. 1814-1822 (2015)

SUMMARY OF THE INVENTION

Technical Problem

However, approximation using the variational Bayesian method may sometimes cause an error or bias in the estimation result and may possibly output estimated values significantly different from those of a true rate function. It is also difficult to quantitatively evaluate the magnitude of the errors of the estimated values and incorrect estimated values may be possibly adopted as correct ones.

One embodiment of the present invention has been made in view of the above points, and has an object of the present invention to analytically estimate a rate function.

Means for Solving the Problem

To achieve the above object, an estimation apparatus according to an embodiment includes a rate function estimation unit that takes a set of observation points representing events observed in a space region of a predetermined dimensionality in an observation, an observation count representing the number of times the observation is performed, a first function satisfying a predetermined condition, and a parameter of the first function as inputs, and analytically estimates a rate function for obtaining occurrence rates of the events in the space region.

Effects of the Invention

It is possible to analytically estimate a rate function.

DESCRIPTION OF EMBODIMENTS

Hereinafter, an embodiment of the present invention will be described. In the present embodiment, an estimation apparatus 10 that can analytically estimate a rate function based on a Gaussian Cox process (hereinafter abbreviated as "GCP") will be described.

First Example

First, a first example of the present embodiment will be described.

Functional Configuration (First Example)

Figure 1:
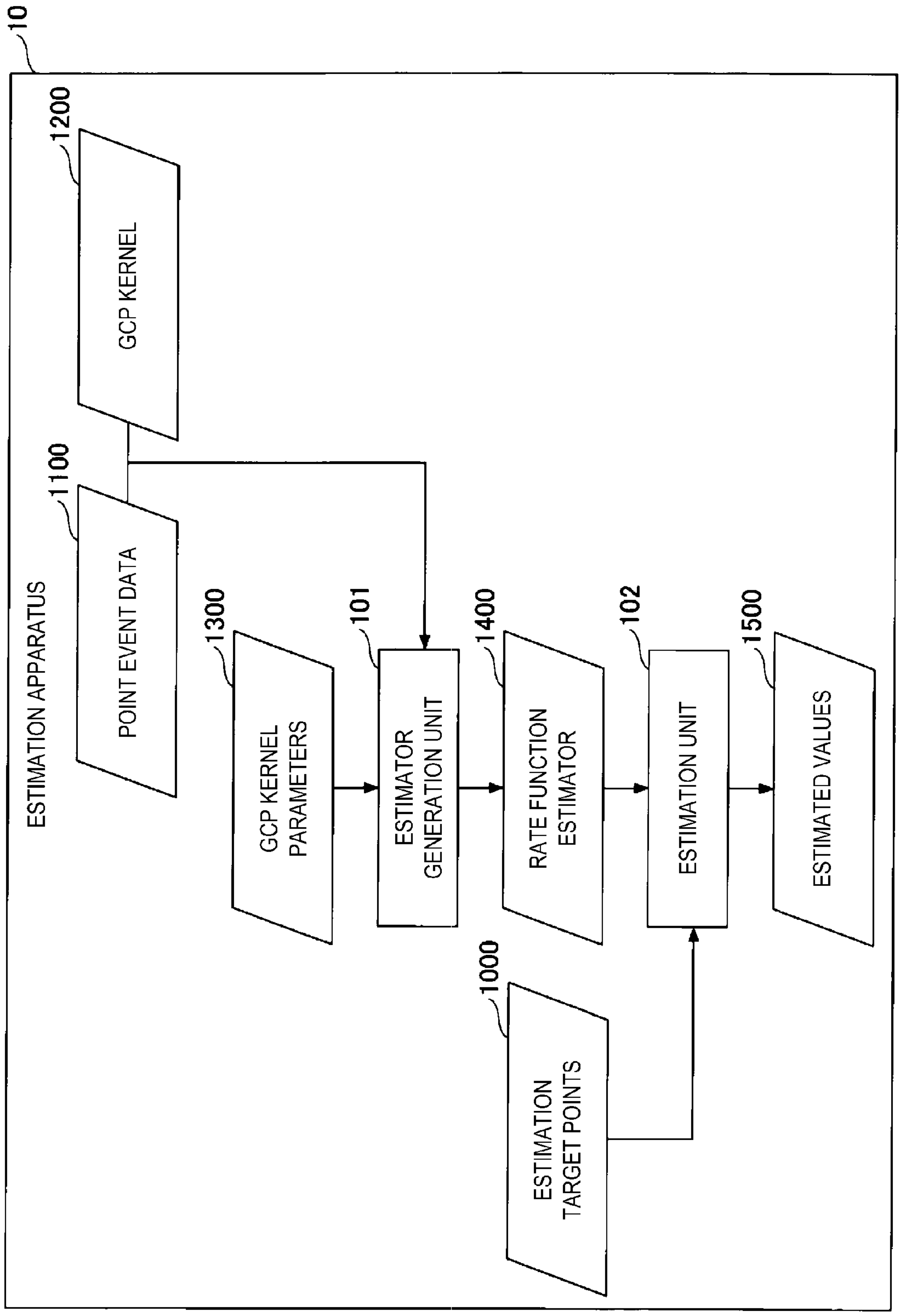
FIG. 1 is a diagram illustrating an example of a functional configuration of an estimation apparatus according to a first example.

A functional configuration of the estimation apparatus 10 according to the first example will be described with reference to FIG. 1. FIG. 1 is a diagram illustrating an example of the functional configuration of the estimation apparatus 10 according to the first example.

As illustrated in FIG. 1, the estimation apparatus 10 according to the first example includes an estimator generation unit 101 and an estimation unit 102. It is assumed that the estimation apparatus 10 according to the first example is given estimation target points 1000, point event data 1100, a GCP kernel 1200, and GCP kernel parameters 1300. Note that the estimation target points 1000, the point event data 1100, the GCP kernel 1200, and the GCP kernel parameters 1300 may be stored in a storage device such as, for example, a hard disk drive (HDD) or a solid state drive (SSD), may be input by a user's operation or the like, or may be received from another apparatus connected via a communication network.

It is assumed that the estimation target points 1000 are a set of P points (coordinate points) $\{s_1, s_2, \ldots, s_P\}$ for which the value of the rate function is to be estimated. These points $s_p$ ($p=1, 2, \ldots, P$) are points for which the value of the rate function is to be estimated in a space region T that will be described later.

The point event data 1100 includes the space region T where observation has been performed, an observation count R indicating the number of times the observation has been performed, and a set of points (coordinate points) $\{t_1, t_2, \ldots t_N\}$ of N events that have been observed in the space region T. The space region T is a region in a space of any dimensionality (one-dimensional or multidimensional) specified in advance.

The GCP kernel 1200 is a function h(t, t') that satisfies the following conditions 1 and 2 where t and t' are any points in the space region T.

Condition 1: his a symmetric function. That is, h(t, t')=h(t', t) holds.

Condition 2: The eigenvalue of an integral operator is 0 or greater and 1/R or less when using the function h(t, t') as a kernel of the integral operator where the eigenvalue ν of the function h(t, t') is defined by the following equation (1):

[Math. 1]

$$\int_T h(t,t')\phi(t')dt' = \nu\phi(t) \tag{1}$$

where φ(t) is an eigenfunction.

Hereinafter, a function satisfying the above conditions 1 and 2 will be referred to as a "GCP kernel" or a "GCP kernel function". Examples of a GCP kernel are shown below.

Example 1 of GCP kernel: A function h expressed as the following equation (2) defined by a positive semi-definite kernel k(t, t') and an upper limit of its eigenvalue $k_{max}$ is a GCP kernel.

[Math. 2]

$$h(t, t) = \frac{2k(t, t')}{1 + 2Rk_{max}} \tag{2}$$

where $k_{max}$ is evaluated as a maximum value of a function obtained by integrating the positive semi-definite kernel k(t, t') with respect to one of the variables (t' in equation (3)) as expressed as the following equation (3):

[Math. 3]

$$k_{max} = \max_t \int_T k(t, t')dt' \tag{3}$$

As the positive semi-definite kernel k(t, t'), a Gaussian kernel $k_{Gauss}$(t, t') having an intensity α and a covariance matrix Σ as parameters, a Matern kernel $k_{Matern}$(t, t') having an intensity α and a scale β as parameters, or the like may be considered. The Gaussian kernel $k_{Gauss}$(t, t') is expressed as the following equation (4) and the Matern kernel $k_{Matern}$ (t, t') is expressed as the following equation (5):

[Math. 4]

$$k_{Gauss}(t, t') = \alpha\left|2\pi\sum\right|^{-\frac{1}{2}}\exp\left(-\frac{1}{2}(t-t')^{\tau}\sum^{-1}(t-t')\right) \tag{4}$$

[Math. 5]

$$k_{Matern}(t, t') = \alpha\left(1 + \frac{1}{\beta}|t-t'|\right)\exp\left(-\frac{1}{\beta}|t-t'|\right) \tag{5}$$

where τ represents a transpose operation for vectors and matrices. Note that other than the Gaussian kernel $k_{Gauss}$(t, t') or the Matern kernel $k_{Matern}$(t, t'), for example, a Wiener kernel $k_{Wiener}$(t, t') can also be used.

Example 2 of GCP kernel: A solution of a Fredholm integral equation of the second kind defined using the positive semi-definite kernel k(t, t') is a GCP kernel. That is, a solution h(t, t') of an integral equation expressed as the following equation (6) is a GCP kernel.

[Math. 6]

$$h(t,t') + 2R\int_T k(t,s)h(s,t')ds = k(t,t') \tag{6}$$

The GCP kernel parameters 1300 are parameter values of the GCP kernel h(t, t'). The number of parameters of the GCP kernel h(t, t') and ranges of values that the parameters can have vary depending on the definition of the GCP kernel h(t, t'). For example, when the function h shown in the above equation (2) is adopted as a GCP kernel using a Gaussian kernel $k_{Gauss}$(t, t') as the positive semi-definite kernel k(t, t'), the parameters are an intensity α and a covariance matrix Σ. On the other hand, for example, when the function h shown in the above equation (2) is adopted as a GCP kernel using a Matern kernel $k_{Matern}$(t, t') as the positive semi-definite kernel k(t, t'), the parameters are an intensity α and a scale β.

The GCP kernel parameters 1300 also include a parameter μ representing the square root of the average value of the rate function. It is assumed that the parameter μ takes a non-negative value.

The value of each parameter included in the GCP kernel parameters 1300 are usually determined based on various prior knowledge, restrictions, and the like of each case to which the estimation apparatus 10 according to the present embodiment is applied. For example, it is conceivable that the parameter β is a value representing several weeks when the function h shown in the above equation (2) is adopted as a GCP kernel using the Matern kernel $k_{Matern}$(t, t') for events of a user of an EC site purchasing a highly seasonal product. It is also conceivable, for example, to estimate a rate function using some candidate parameter values, compare the estimation results, and adopt a parameter value that is subjectively considered appropriate.

The estimator generation unit 101 takes the point event data 1100, the GCP kernel 1200, and the GCP kernel parameters 1300 given to the estimation apparatus 10 as inputs, and generates and outputs a rate function estimator 1400.

The rate function estimator 1400 is a function λ(t) for obtaining an estimated value of the rate function at any point t in the space region T. This function λ(t) is expressed as the following equation (7):

[Math. 7]

$$\lambda(t) = [\mu(1 - R\underline{h}(t)) + h(t,:)^{\tau}z]^2, t \in T \tag{7}$$

where $$\underline{h}(t)$$ [Math. 8]

is a function obtained by integrating the GCP kernel h(t, t') in the space region T, h(t, :) is a vector composed of the values of the GCP kernel at the coordinate points $t_1, t_2, \ldots t_N$ of N events, and z is a vector composed of the reciprocals of the square roots of the estimated values of the rate function at the coordinate points $t_1, t_2, \ldots t_N$ of the N events. That is, $$\underline{h}(t) \equiv \int_T h(t,t')dt'$$

$$h(t,:) \equiv (h(t,t_1), \ldots, h(t,t_N))^{\tau}$$

$$z = (z_1, \ldots, z_N)^{\tau} \equiv (\lambda^{-1/2}(t_1), \ldots, \lambda^{-1/2}(t_N))^{\tau}$$ [Math. 9]

As shown in the above equation (7), the rate function estimator 1400 (that is, λ(t)) is constituted with the following five elements:

$$R, \mu, \underline{h}(t), h(t,:), z \quad \text{[Math. 10]}$$

Thus, the estimator generation unit 101 outputs the rate function estimator 1400 by outputting these five elements. At this time, the estimator generation unit 101 outputs the rate function estimator 1400 after generating (calculating) z, which is an unknown number among the five elements, through calculation. Here, because each element $z_n=\lambda^{-1/2}(t_n)$ of the N-dimensional vector z is a function of an estimated value of the rate function, and the estimated value of the rate function is a function of z according to the above equation (7), there exists a conditional expression for the relationship between the two to hold consistently, and z is calculated by solving the conditional expression. This conditional expression is a system of simultaneous quadratic equation with N unknowns expressed as the following equation (8):

[Math. 11]

$$z_n \sum_{n'} h(t_n, t_{n'}) z_{n'} + \mu(1 - R\underline{h}(t_n)) z_n - 1 = 0,\ 1 \le n \le N \quad (8)$$

where n' also satisfies 1≤n'≤N.

The estimation unit 102 takes the estimation target points 1000 given to the estimation apparatus 10 and the rate function estimator 1400 output by the estimator generation unit 101 as inputs, and calculates and outputs estimated values 1500. That is, the estimation unit 102 substitutes the P points $s_1, s_2, \ldots, s_P$ into λ(t) shown in the above equation (7) to calculate a set of estimated values of the rate function $\{\lambda(s_1), \lambda(s_2), \ldots, \lambda(s_P)\}$. This set $\{\lambda(s_1), (s_2), \ldots, \lambda(s_P)\}$ is the estimated values 1500.

Estimation Processing (First Example)

Figure 2:
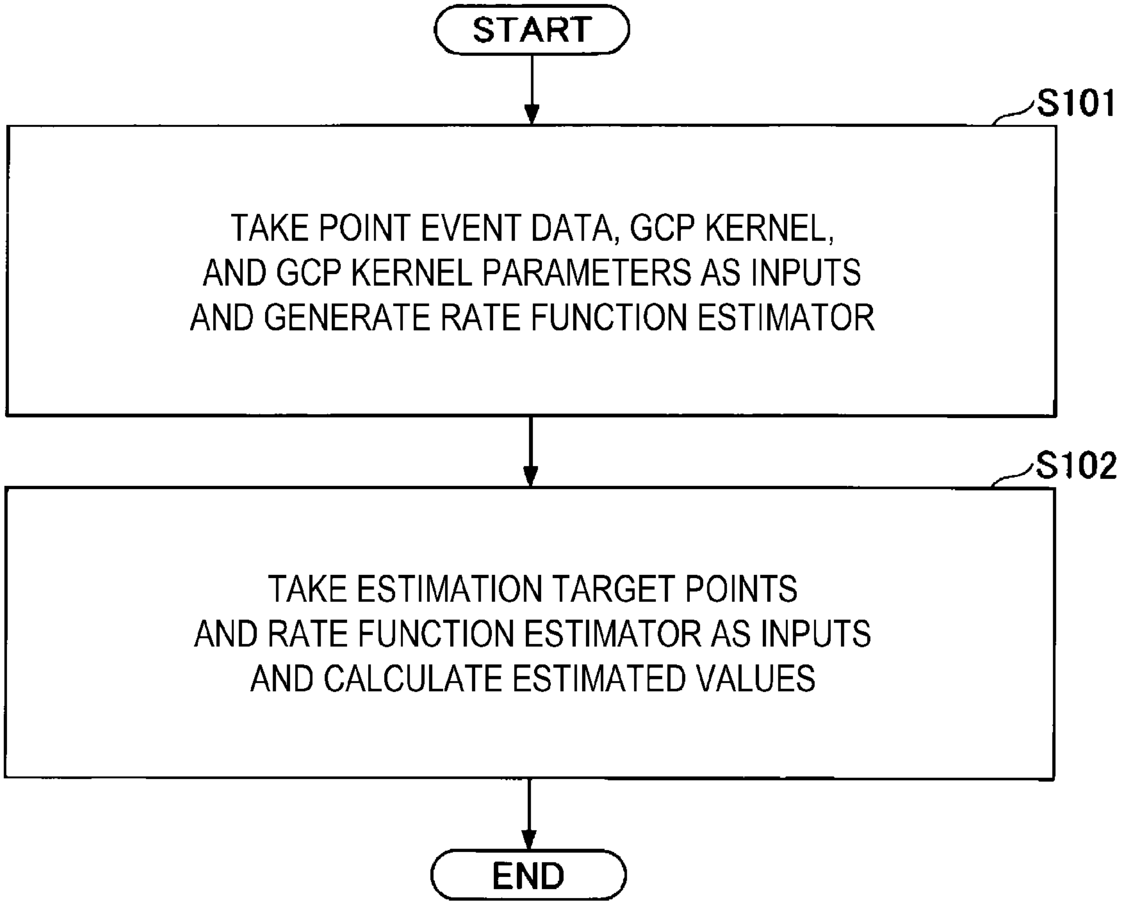
FIG. 2 is a flowchart showing an example of a flow of estimation processing according to the first example.

Next, a flow of estimation processing executed by the estimation apparatus 10 according to the first example for obtaining the estimated values 1500 will be described with reference to FIG. 2. FIG. 2 is a flowchart showing an example of the flow of the estimation processing according to the first example.

Step S101: First, the estimator generation unit 101 takes the point event data 1100, the GCP kernel 1200, and the GCP kernel parameters 1300 given as inputs, and generates and outputs a rate function estimator 1400.

Step S102: Then, the estimation unit 102 takes the given estimation target points 1000 and the rate function estimator 1400 output in the above step S101 as inputs, and calculates and outputs the estimated values 1500. As a result, a set of estimated values of the rate function $\{\lambda(s_1), \lambda(s_2), \ldots, \lambda(s_P)\}$ is obtained. At this time, because the estimation apparatus 10 according to the first example estimates the rate function analytically based on GCP without using approximation, it is possible to prevent a situation in which an unintended error or bias is included in the estimation result.

Note that the processing of step S101 may be executed in advance before the processing of step S102 is executed (in this case, the rate function estimator 1400 is stored in a storage device or the like, and in the processing of step S101, the rate function estimator 1400 is read from the storage device or the like). At this time, if the processing of the above step S102 is executed a plurality of times using the same rate function estimator 1400, the processing of the above step S101 may be executed once. Alternatively, for example, if the processing of the above step S101 is executed on another apparatus and a rate function estimator 1400 is given from the other apparatus, the estimation apparatus 10 may execute only the processing of the above step S102 (in this case, the system may be constituted with the other apparatus and the estimation apparatus 10, and the other apparatus may include the estimator generation unit 101 whereas the estimation apparatus 10 may not include the estimator generation unit 101).

Second Example

Next, a second example of the present embodiment will be described. The second example will be described with respect to the case where the value of each parameter included in the GCP kernel parameters 1300 are determined without subjectivity rather than being determined subjectively.

Functional Configuration (Second Example)

Figure 3:
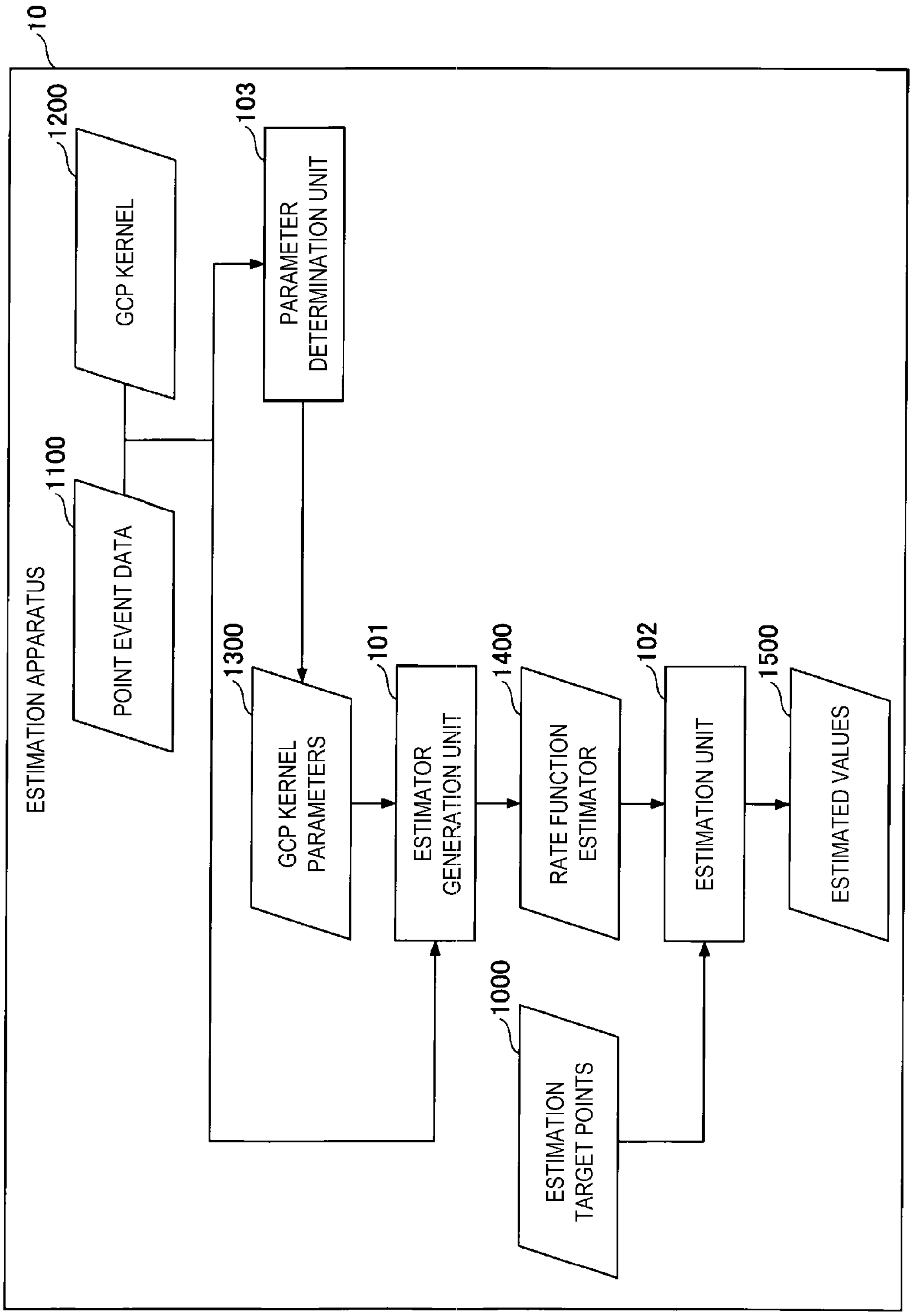
FIG. 3 is a diagram illustrating an example of a functional configuration of an estimation apparatus according to a second example.

A functional configuration of the estimation apparatus 10 according to the second example will be described with reference to FIG. 3. FIG. 3 is a diagram illustrating an example of the functional configuration of the estimation apparatus 10 according to the second example.

As illustrated in FIG. 3, the estimation apparatus 10 according to the second example includes an estimator generation unit 101, an estimation unit 102, and a parameter determination unit 103. It is assumed that the estimation apparatus 10 according to the second example is given estimation target points 1000, point event data 1100, and a GCP kernel 1200. The estimation target points 1000, the point event data 1100, and the GCP kernel 1200 may be stored in a storage device such as an HDD or SSD, may be input by a user's operation or the like, or may be received from another apparatus connected via a communication network.

Because the estimator generation unit 101 and the estimation unit 102 are substantially the same as those in the first example, description thereof will be omitted. However, the estimator generation unit 101 receives as input GCP kernel parameters 1300 output by the parameter determination unit 103.

The parameter determination unit 103 takes the point event data 1100 and the GCP kernel 1200 given to the estimation apparatus 10 as inputs, and outputs the GCP kernel parameters 1300. That is, the parameter determination unit 103 optimizes the value of each parameter included in the GCP kernel parameters 1300 through cross validation using the space region T, the observation count R, the set of points of N events $\{t_1, t_2, \ldots, t_N\}$, and the GCP kernel h(t, t'). Specifically, the parameter determination unit 103 divides, for example, the set of points of N events $\{t_1, t_2, \ldots, t_N\}$ into K batches (subsets) to use K−1 batches for training and the remaining one batch for validation, and repeats change and validation of parameter values while switching the batch for validation to optimize each parameter value. Note that K may be determined according to the space region T and the observation count R.

Estimation Processing (Second Example)

Figure 4:
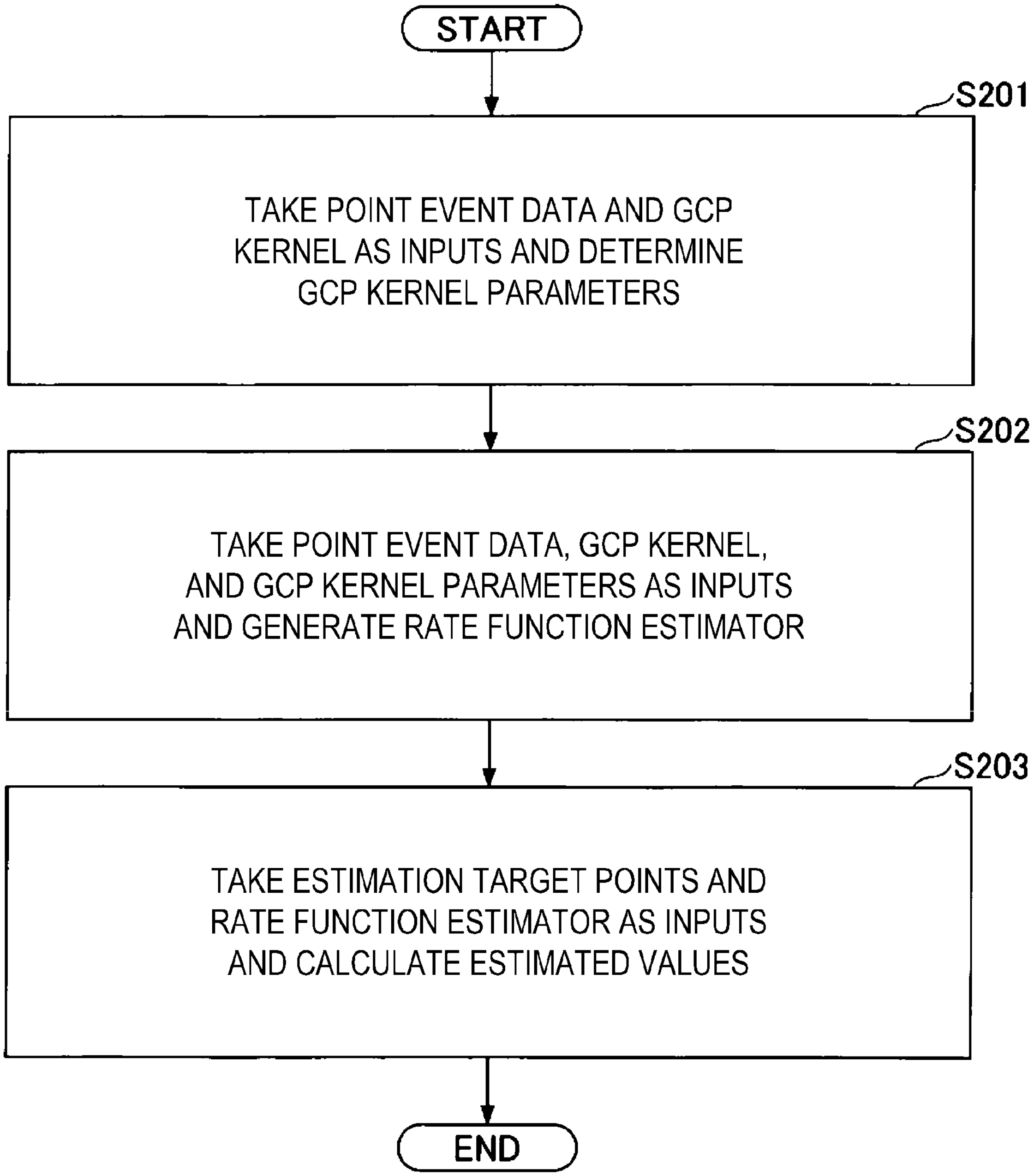
FIG. 4 is a flowchart showing an example of a flow of estimation processing according to the second example.

Next, a flow of estimation processing executed by the estimation apparatus 10 according to the second example for obtaining the estimated values 1500 will be described with reference to FIG. 4. FIG. 4 is a flowchart showing an example of the flow of the estimation processing according to the second example.

Step S201: First, the parameter determination unit 103 takes the point event data 1100 and the GCP kernel 1200 given as inputs, and outputs the GCP kernel parameters 1300.

Step S202: Next, the estimator generation unit 101 takes the given point event data 1100 and GCP kernel 1200, and the GCP kernel parameters 1300 output in the above step S201 as inputs, and generates and outputs a rate function estimator 1400.

Step S203: Then, the estimation unit 102 takes the given estimation target points 1000 and the rate function estimator 1400 output in the above step S202 as inputs, and calculates and outputs the estimated values 1500. As a result, a set of estimated values of the rate function $\{\lambda(s_1), (s_2), \ldots, \lambda(s_P)\}$ is obtained. Moreover, because the estimation apparatus 10 according to the second example can optimize the GCP kernel parameters 1300, it is possible to obtain accurate estimated values of the rate function even for users who lack enough knowledge and experience regarding prior knowledge, restrictions, and the like of the case to which the estimation apparatus 10 according to the present embodiment is applied.

Note that as in the first example, the processing of the above steps S201 and S202 may be executed in advance or the processing of the above steps S201 and S202 may be executed on another apparatus.

Third Example

Next, a third example of the present embodiment will be described. In the third example, the case where errors of the estimated values of the rate function are also calculated, will be described.

Functional Configuration (Third Example)

Figure 5:
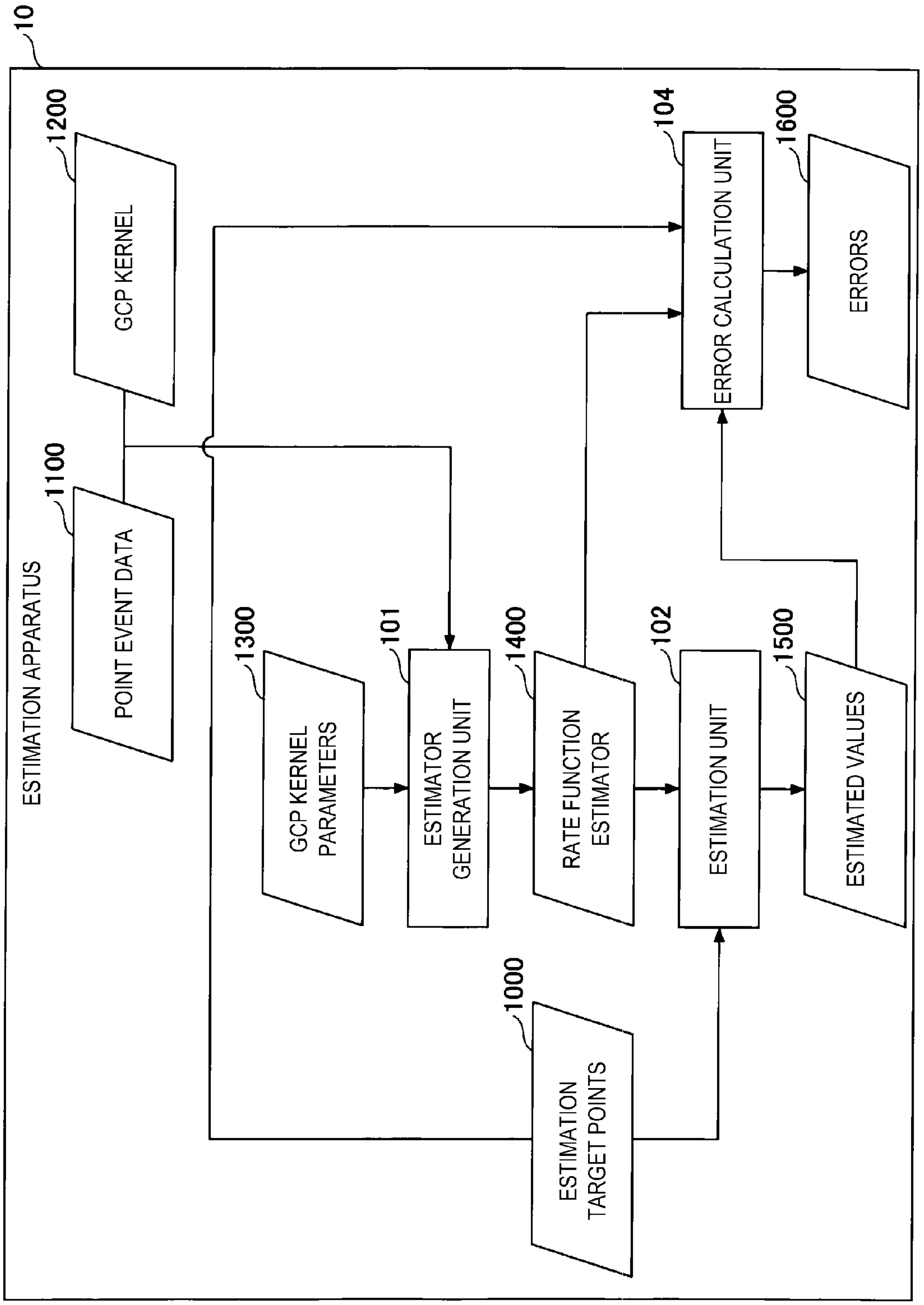
FIG. 5 is a diagram illustrating an example of a functional configuration of an estimation apparatus according to a third example.

A functional configuration of the estimation apparatus 10 according to the third example will be described with reference to FIG. 5. FIG. 5 is a diagram illustrating an example of the functional configuration of the estimation apparatus 10 according to the third example.

As illustrated in FIG. 5, the estimation apparatus 10 according to the third example includes an estimator generation unit 101, an estimation unit 102, and an error calculation unit 104. It is assumed that the estimation apparatus 10 according to the third example is given estimation target points 1000, point event data 1100, a GCP kernel 1200, and GCP kernel parameters 1300. The estimation target points 1000, the point event data 1100, the GCP kernel 1200, and the GCP kernel parameters 1300 may be stored in a storage device such as an HDD or SSD, may be input by a user's operation or the like, or may be received from another apparatus connected via a communication network.

Because the estimator generation unit 101 and the estimation unit 102 are substantially the same as those in the first example, description thereof will be omitted.

The error calculation unit 104 takes the estimation target points 1000 given to the estimation apparatus 10, the rate function estimator 1400 output by the estimator generation unit 101, and the estimated values 1500 output by the estimation unit 102 as inputs, and calculates and outputs errors 1600. The errors 1600 are estimation errors (a covariance matrix) at P points $s_1, s_2, \ldots, s_P$ to be estimated with respect to the square root of the rate function. These estimation errors $\sigma(t)$ are calculated by the following equation (9):

$$\sigma(t) = \frac{1}{2}\left[h(t, t) - h(t, :)^{\top}(\Lambda + H)^{-1}h(t, :)\right], t \in \{s_1, s_2, \ldots, s_P\} \tag{9}$$

where $\Lambda$ and H are N×N matrices wherein each (n, n') component of $\Lambda$ is $\Lambda_{nn'}=\lambda(t_n)\delta_{nn'}$ and each (n, n') component of H is $H_{nn'}=h(t_n, t_{n'})$. Note that $\delta_{nn'}$ is a function that is 1 when n=n' and 0 otherwise.

Estimation Processing (Third Example)

Figure 6:
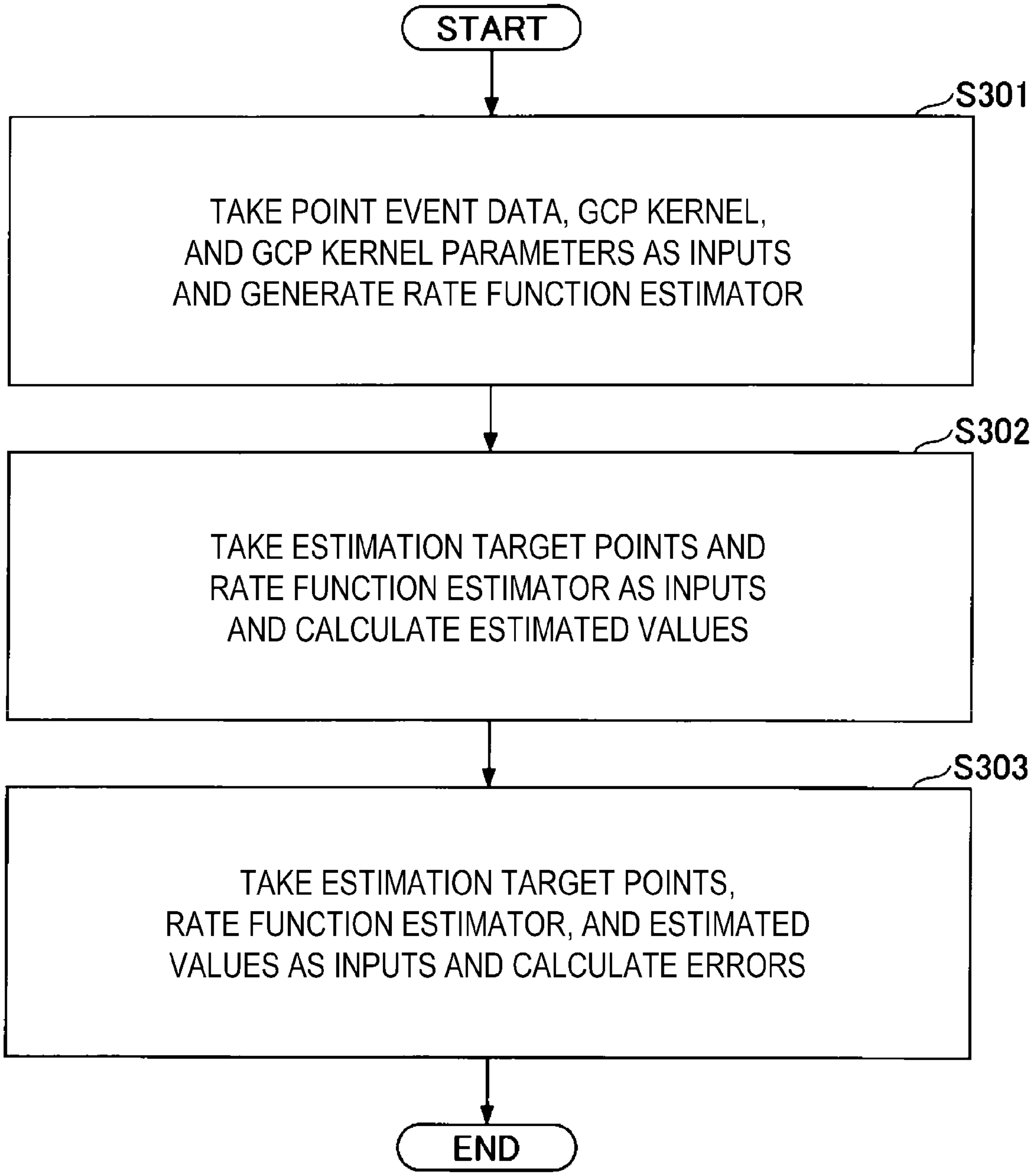
FIG. 6 is a flowchart showing an example of a flow of estimation processing according to the third example.

Next, a flow of estimation processing executed by the estimation apparatus 10 according to the third example for obtaining the estimated values 1500 and the errors 1600 will be described with reference to FIG. 6. FIG. 6 is a flowchart showing an example of the flow of the estimation processing according to the third example.

Step S301: First, the estimator generation unit 101 takes the point event data 1100, the GCP kernel 1200, and the GCP kernel parameters 1300 given as inputs, and generates and outputs a rate function estimator 1400.

Step S302: Next, the estimation unit 102 takes the given estimation target points 1000 and the rate function estimator 1400 output in the above step S301 as inputs, and calculates and outputs the estimated values 1500.

Step S303: Then, the error calculation unit 104 takes the given estimation target points 1000, the rate function estimator 1400 output in the above step S301, and the estimated values 1500 output in the above step S302 as inputs, and calculates and outputs errors 1600. As a result, not only the set of estimated values of the rate function $\{\lambda(s_1), \lambda(s_2), \ldots, \lambda(s_P)\}$ but also a set of estimation errors $\{\sigma(s_1), \sigma(s_2), \ldots, \sigma(s_P)\}$ are obtained. Thus, the estimation apparatus 10 according to the third example can quantitatively evaluate the magnitude of the errors of the estimated values of the rate function.

Note that as in the first example, the processing of the above step S301 may be executed in advance or the processing of the above step S301 may be executed on another apparatus.

APPLICATION EXAMPLES

Next, application examples in which the estimation apparatus 10 according to the present embodiment is applied to specific cases will be described.

First Application Example

A situation where a person in charge of advertising strategy on an EC site identifies users to whom the next summer sale advertisement for a certain product is to be preferentially sent will be considered. First, purchase time data obtained by extracting a purchase time sequence for each user from purchase history data (a set of data items each represented by a pair of a user ID and a purchase time) regarding the product on the EC site is prepared. The purchase time data of one user is a set of points of events $\{t_1, t_2, \ldots, t_N\}$. Here, it is assumed that a time takes a value of a one-year cycle at intervals of one second (01-01 00:00:00 to 12-31 23:59:59). At this time, for example, the space region T is a one-dimensional space, and the observation count R is three if using purchase history data for the past three years.

By giving point event data 1100 including the purchase time data of one user, the space region T, and the observation count R and a GCP kernel 1200 and GCP kernel parameters 1300 selected by the person in charge of advertising strategy to the estimation apparatus 10, a rate function estimator 1400 is output.

Next, the person in charge of advertising strategy gives the estimation apparatus 10 a sequence of time points $\{s_1, s_2, \ldots, s_P\}$ obtained by dividing a period during which advertisement is to be sent into intervals of one second, as estimation target points 1000. As a result, estimated values 1500 (that is, $\lambda(s_1)$, $(s_2)$, . . . , $\lambda(s_P)$) of the probabilities of purchase occurrence of the user at the time points in the period are obtained.

For example, under a hypothesis that advertisement is highly effective for users with a high probability of purchase occurrence, the person in charge of advertising strategy can select users each having a high probability of purchase occurrence on average, and set up a schedule for preferentially sending advertisements to the selected users.

Note that when there is no prior knowledge on the business regarding parameter values of the GCP kernel, the parameter values may be determined by the parameter determination unit 103 described in the second example. In addition to the purchase occurrence probabilities, estimation errors may be calculated by the error calculation unit 104 described in the third example. By calculating the estimation errors together with the purchase occurrence probabilities, for example, probabilities that the purchase occurrence probabilities take a certain value or greater, rather than estimated values of the purchase occurrence probabilities, can be calculated for each user. The probabilities also take into account errors of the estimated values, and hence, may be used as more robust indices for identifying users with a high probability of purchase occurrence.

Second Application Example

A situation where a national government, a local government, or a security company formulates an annual deployment plan of security guards in a target area will be considered. First, a person in charge prepares past crime occurrence history data (a set of data items each being a three-dimensional vector represented by an occurrence time and the latitude and longitude of an occurrence position). This crime occurrence history data is a set of points of events $\{t_1, t_2, \ldots, t_N\}$. Here, it is assumed that a time takes a value of a one-year cycle at intervals of one second (01-01 00:00:00 to 12-31 23:59:59) and the latitude and longitude take decimal values at intervals of 0.000001 degrees. At this time, for example, the space region T is a three-dimensional space, and the observation count R is five, if using crime occurrence history data for the past five years.

By giving point event data 1100 including the crime occurrence history data, the space region T, and the observation count R; and a GCP kernel 1200 and GCP kernel parameters 1300 selected by the person in charge to the estimation apparatus 10, a rate function estimator 1400 is output.

Next, the person in charge gives the estimation apparatus 10 a sequence of points in time and space $\{s_1, s_2, \ldots, s_P\}$, obtained by dividing one year into intervals of one second and dividing the target area into intervals of 0.000001 degrees, as estimation target points 1000. As a result, estimated values 1500 of the crime occurrence rate at the points in time and space (that is, $\lambda(s_1)$, $(s_2)$, . . . , $\lambda(s_P)$) are obtained. Thus, the person in charge can formulate an effective annual deployment plan of security guards by identifying hours and areas where the crime occurrence rate is high.

Note that, for example, it is also possible to estimate and utilize the infectious disease occurrence rate by the same method as in the case of estimating the crime occurrence rate for formulating an annual deployment plan of security guards. In this case, past infectious disease occurrence history data of a target area may be used. At this time, the infectious disease occurrence history data may include, for example, location information (latitude, longitude, and altitude) of the target area, time information (hours in a day, a season in a year, etc.), weather information (sunny weather, rainy weather, etc.) (that is, the infectious disease occurrence history data may be, for example, a set of multidimensional vectors each including information on, for example, latitude, longitude, altitude, hours, weather, etc.). This makes it possible to estimate a rate function for the occurrence of infectious diseases under various conditions and to formulate effective health and hygiene measures.

Evaluation

Next, an evaluation of the estimation processing method (the proposed method) performed by the estimation apparatus 10 according to the present embodiment will be described. This evaluation was performed using an artificial data set provided at "URL: https://github.com/VirgiAgl/STVB" on the Internet, similar to the method described in "4 Experiments" in a reference "Aglietti, V., Bonilla, E. V., Damoulas, T., and Cripps, S. Structured variational inference in continuous cox process models. In Advances in Neural Information Processing Systems, pp. 12437-12447, 2019".

The method described in NPL 1 above was adopted as a conventional method to be compared with the proposed method. Average L2 norm errors between estimated values and true values of the rate function were adopted as an evaluation index where the averages were averages over 10 trials. The evaluation results are shown in Table 1 below.

TABLE 1

| | $PP_{Gauss}$ | $PP_{Matern}$ | $PP_{Wiener}$ | VBPP |
|---|---|---|---|---|
| $\lambda_1(t)$ | 4.05 | 3.64 | 5.00 | 9.19 |
| | (1.85) | (1.51) | (1.68) | (2.32) |
| $\lambda_2(t)$ | 39.67 | 46.42 | 54.94 | 48.15 |
| | (9.88) | (11.14) | (12.63) | (13.16) |
| $\lambda_3(t)$ | 8.28 | 8.69 | 9.78 | 20.54 |
| | (2.50) | (2.94) | (2.75) | (6.53) |

Here, $PP_{Gauss}$, $PP_{Matern}$, and $PP_{Wiener}$ represent proposed methods adopting a Gaussian kernel $k_{Gauss}(t, t')$, a Matern kernel $k_{Matern}(t, t')$, and a Wiener kernel $k_{Wiener}(t, t')$, respectively, as the positive semi-definite kernel $k(t, t')$ where the function h shown in the above equation (2) is adopted as a GCP kernel. VBPP represents the method described in NPL 1 above.

$\lambda_1(t)$, $\lambda_2(t)$, and $\lambda_3(t)$ in Table 1 above are intensity functions used to generate sequences of points included in the artificial dataset, similar to those described in "4 Experiments" in the above reference. Numbers in parentheses in Table 1 above are standard L2 norm errors between the estimated values and the true values of the rate function over 10 trials.

As shown in Table 1 above, it can be seen that, in the case of using a sequence of points generated by the intensity function $\lambda_2(t)$, $PP_{Wiener}$ is slightly less accurate than VBPP, whereas in other cases, the proposed methods can accurately estimate rate functions compared to the conventional method.

Hardware Configuration

Figure 7:
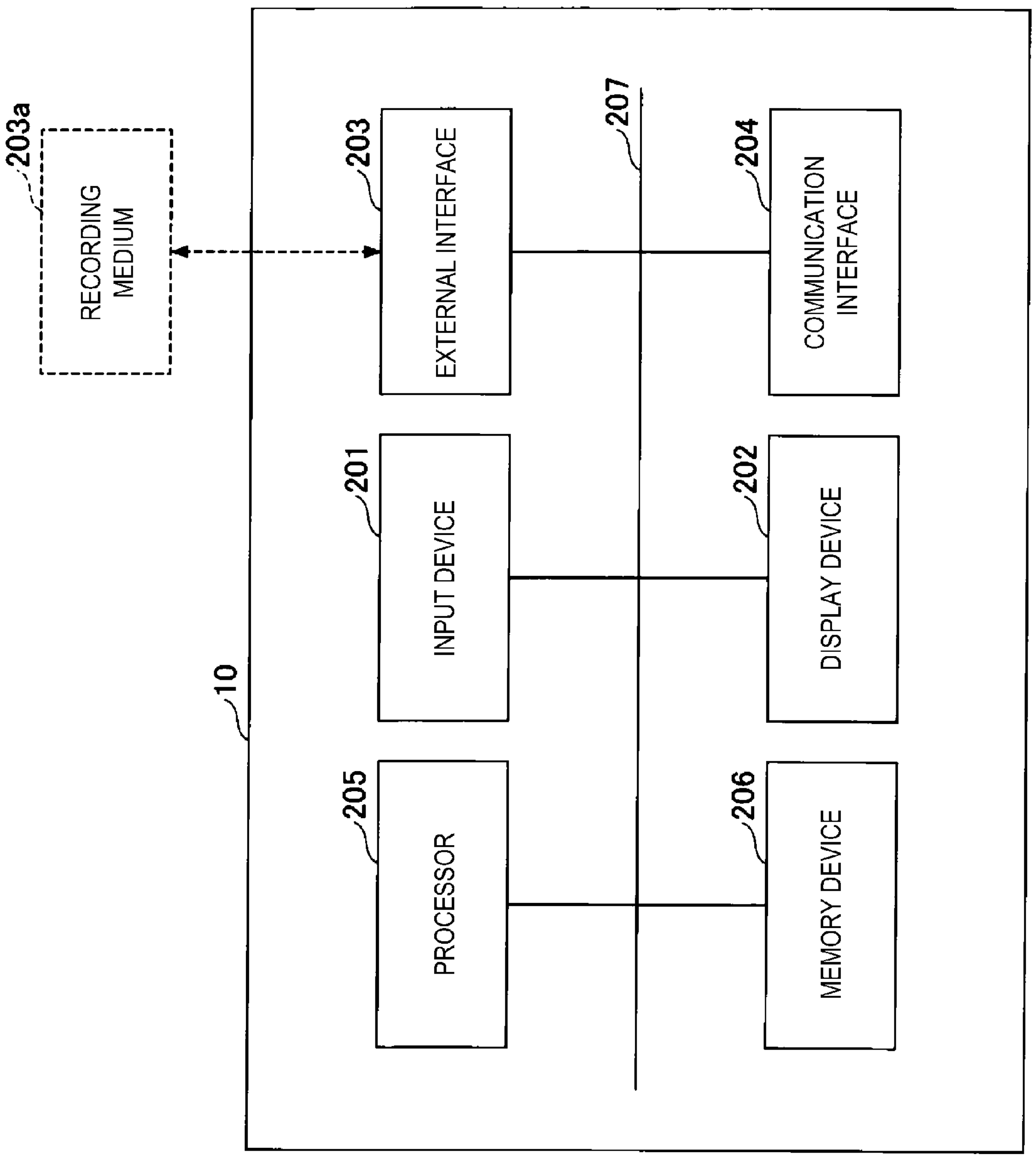
FIG. 7 is a diagram illustrating an example of a hardware configuration of an estimation apparatus according to the present embodiment.

Finally, a hardware configuration of the estimation apparatus 10 according to the present embodiment will be described with reference to FIG. 7. FIG. 7 is a diagram illustrating an example of the hardware configuration of the estimation apparatus 10 according to the present embodiment.

As illustrated in FIG. 7, the estimation apparatus 10 according to the present embodiment is implemented by a general computer or computer system, and includes an input device 201, a display device 202, an external interface 203, a communication interface 204, a processor 205, and a memory device 206. These hardware components are communicably connected with each other via a bus 207.

The input device 201 includes, for example, a keyboard, a mouse, and a touch panel. The display device 202 is, for example, a display. Note that the estimation apparatus 10 may not include at least one of the input device 201 and the display device 202.

The external interface 203 is an interface with an external device such as a recording medium 203*a*. The estimation apparatus 10 can perform reading and writing from and to the recording medium 203*a* or the like via the external interface 203. The recording medium 203*a* may store, for example, one or more programs that implement each of the functional units (the estimator generation unit 101, the estimation unit 102, the parameter determination unit 103, and the error calculation unit 104) included in the estimation apparatus 10. Examples of the recording medium 203*a* include a compact disc (CD), a digital versatile disk (DVD), a secure digital (SD) memory card, and a universal serial bus (USB) memory card.

The communication interface 204 is an interface for connecting the estimation apparatus 10 to the communication network. One or more programs that implement each functional unit of the estimation apparatus 10 may be acquired (downloaded) from a predetermined server device or the like via the communication interface 204.

The processor 205 is any of various arithmetic/logic units such as, for example, a central processing unit (CPU). Each functional unit of the estimation apparatus 10 is implemented, for example, by processing that one or more programs stored in the memory device 206 cause the processor 205 to execute.

The memory device 206 is any of various storage devices such as, for example, an HDD, an SSD, a random access memory (RAM), a read only memory (ROM), or a flash memory.

The estimation apparatus 10 according to the present embodiment can implement the estimation processing described above by having the hardware configuration illustrated in FIG. 7. The hardware configuration illustrated in FIG. 7 is an example and the estimation apparatus 10 may have another hardware configuration. For example, the estimation apparatus 10 may have a plurality of processors 205 or a plurality of memory devices 206.

The present invention is not limited to the specific embodiment disclosed above and various modifications, changes, combinations with known techniques, and the like can be made without departing from the scope of the claims. The examples can be combined. For example, the second and third examples can be combined to configure an estimation apparatus 10 having the estimator generation unit 101, the estimation unit 102, the parameter determination unit 103, and the error calculation unit 104.

REFERENCE SIGNS LIST

10 Estimation apparatus
101 Estimator generation unit
102 Estimation unit
103 Parameter determination unit
104 Error calculation unit
201 Input device
202 Display device
203 External interface
203*a* Recording medium
204 Communication interface
205 Processor
206 Memory device
207 Bus

The invention claimed is:

1. An estimation apparatus for estimating placement of security guards in an area, comprising:
- a memory; and
- a processor configured to execute:
- receiving, as first input, a set of observation points representing events of crime observed in a space region of a predetermined dimensionality in an observation of crime, an observation count representing a number of times the observation of crime is performed, a first function satisfying a predetermined condition, and a parameter of the first function;
- analytically generating, based on the first input received, a rate function for obtaining occurrence rates of the events of crime in the space region,
  - wherein the rate function comprises parameters including:
    - the observation count,
    - a parameter representing a square root of an average value of the rate function, a second function obtained by integrating the first function in the space region,
    - a vector representing values of the first function at the observation points, and
    - a vector representing reciprocals of square roots of estimated values of the rate function at the observation points; and
- creating, based on second input and the rate function analytically generated, placement plan data of security guards by calculating occurrence rates of events of crime at a set of estimation target points according to the rate function,
  - wherein the second input comprises the set of estimation target points representing target locations of crime occurrences over time, respective estimation target points of the set of estimation target points are in the space region and represent estimation targets for the occurrence rates of the events of crime, and
  - the placement plan data of security guards is according to time and locations of increased occurrence rates of events of crime.

2. The estimation apparatus according to claim 1, wherein the predetermined condition is that the first function is a symmetric function and an eigenvalue is 0 or greater and 1/R or less when the observation count is R and the first function is used as a kernel function of an integral operator.

3. The estimation apparatus according to claim 1, wherein the processor is further configured to execute:

receiving, as third input, a set of estimation target points representing points, the points being in the space region and being estimation targets for the occurrence rates of the events of crime; and calculating, based on the third input, occurrence rates of events of crime at the set of estimation target points.

4. A non-transitory computer-readable recording medium having computer-readable instructions stored thereon, which when executed, cause a computer to operate as the estimation apparatus according to claim 1.

5. An estimation system for estimating placement of security guards in an area, comprising:

a first processor configured to execute operations comprising analytically creating, based on first input, a rate function, wherein the first input comprises a set of observation points representing events of crime observed in a space region of a predetermined dimensionality in an observation of the events of crime, an observation count representing a number of times the observation of the events of crime is performed, a first function satisfying a predetermined condition, and a parameter of the first function, and the rate function computes occurrence rates of the events of crime in the space region; and a second processor configured to execute operations comprising:

calculating, based on second input and the rate function, occurrence rates of events of crime at a set of estimation target points, wherein the second input comprises the set of estimation target points representing points, the points are in the space region, and the points represent estimation targets for the occurrence rates of the events of crime; and creating, based on the occurrence rates of events of crime, placement plan data of security guards, wherein the placement plan data of security guards is according to time and locations of increased occurrence rates of events of crime.

6. An estimation method executed by a computer including a memory and a processor for estimating placement of security guards in an area, comprising:

receiving, as first input, a set of observation points representing events of crime observed in a space region of a predetermined dimensionality in an observation of the events of crime, an observation count representing a number of times the observation is performed, a first function satisfying a predetermined condition, and a parameter of the first function;

analytically generating, based on the first input received, a rate function for obtaining occurrence rates of the events of crime in the space region, wherein the rate function comprises parameters including:

the observation count, a parameter representing a square root of an average value of the rate function, a second function obtained by integrating the first function in the space region, a vector representing values of the first function at the observation points, and a vector representing reciprocals of square roots of estimated values of the rate function at the observation points; and creating, based on second input and the rate function analytically generated, placement plan data of security guards by calculating occurrence rates of events of crime at a set of estimation target points according to the rate function, wherein the second input comprises the set of estimation target points representing target locations of crime occurrences over time, respective estimation target points of the set of estimation target points are in the space region and represent estimation targets for the occurrence rates of the events of crime, and the placement plan data of security guards is according to time and locations of increased occurrence rates of events of crime.

* * * * *